June 22, 1965  R. B. ELLIS ETAL  3,190,976
GEARED DRIVING MEANS FOR TIMERS AND THE LIKE
Filed Jan. 31, 1962  3 Sheets-Sheet 1
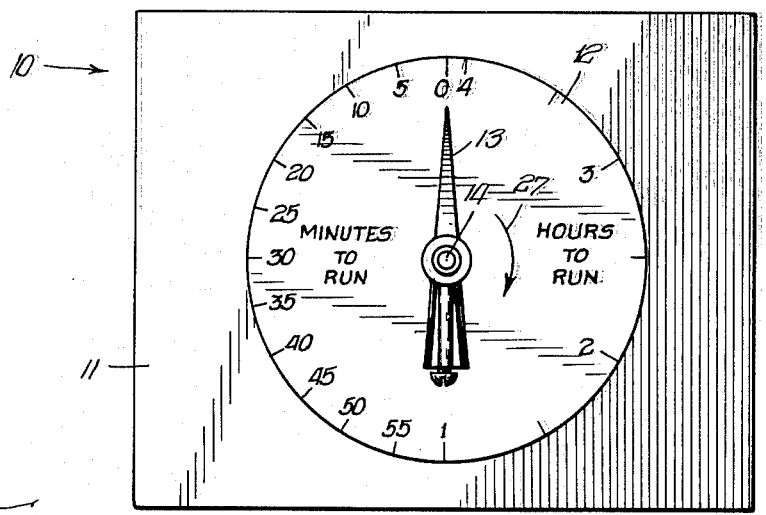
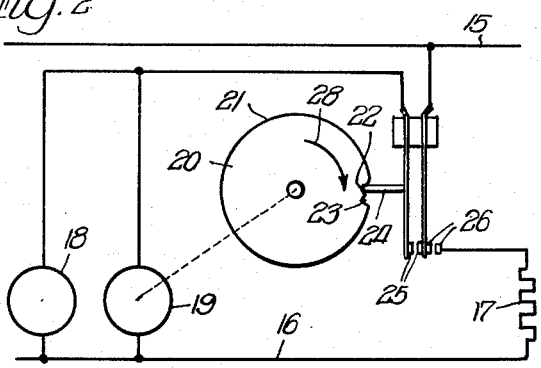
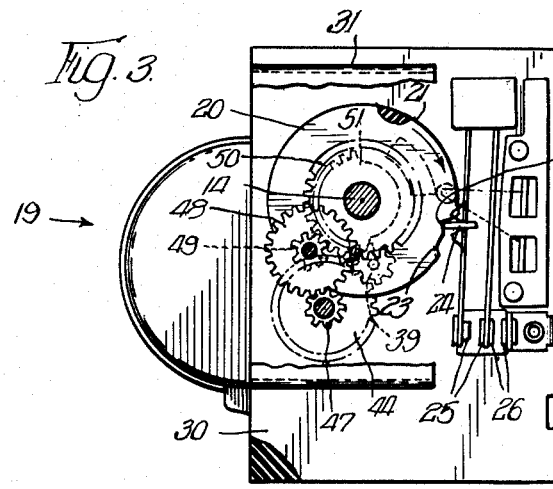
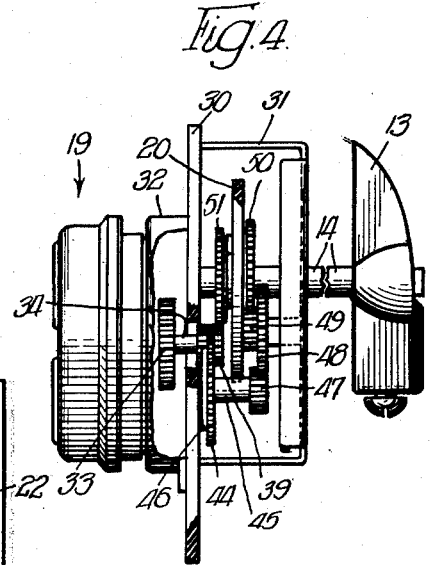
INVENTORS
Robert B. Ellis,
BY Benjamin L. Gelfand,
Robert R. Lockwood June 22, 1965 R. B. ELLIS ETAL 3,190,976
GEARED DRIVING MEANS FOR TIMERS AND THE LIKE
Filed Jan. 31, 1962 3 Sheets-Sheet 2
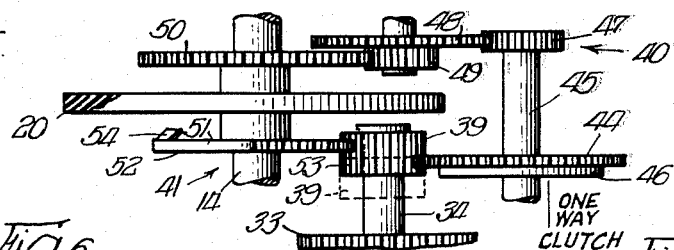
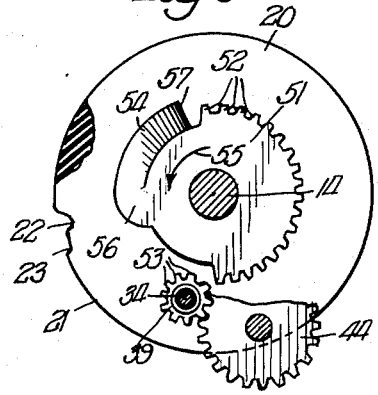 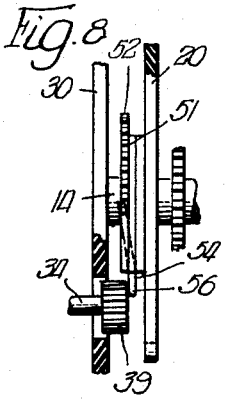 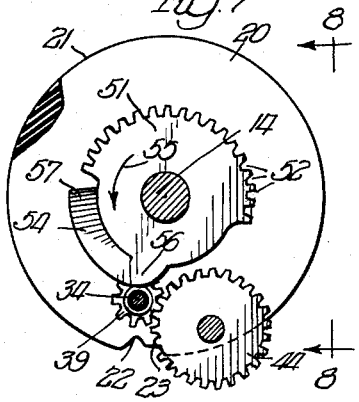
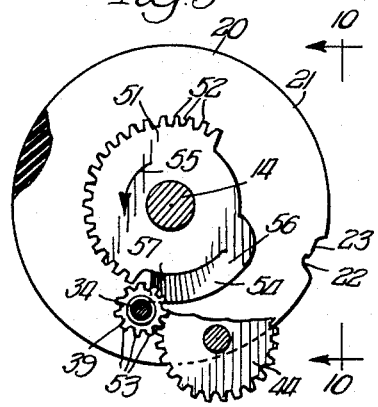 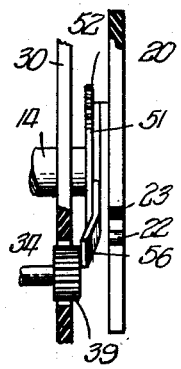 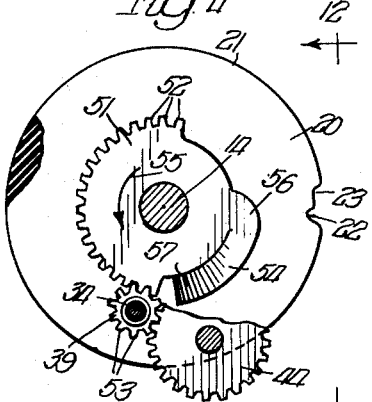
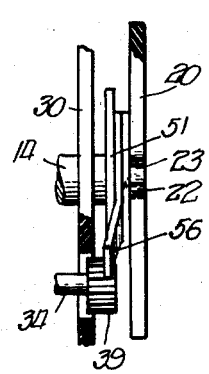 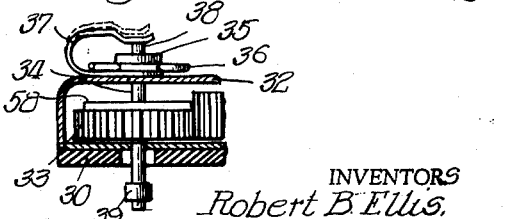
INVENTORS
Robert B. Ellis,
BY Benjamin L. Gelfand,
Robert R. Lockwood
ATTY.

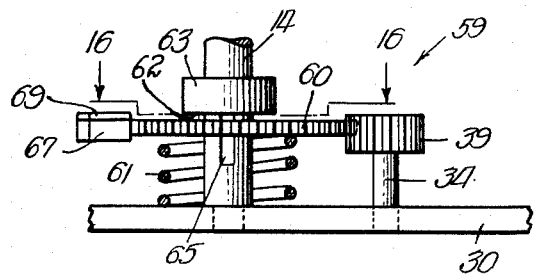
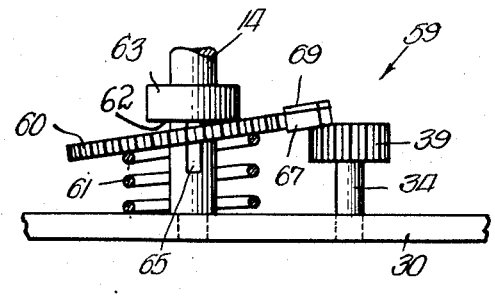
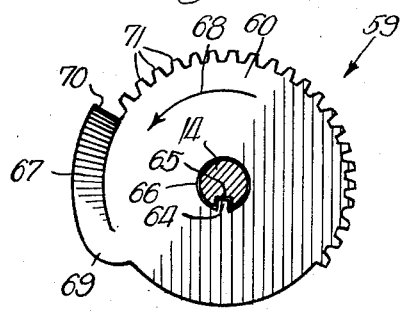

United States Patent Office 3,190,976
Patented June 22, 1965

3,190,976
GEARED DRIVING MEANS FOR TIMERS AND THE LIKE
Robert B. Ellis, Franklin Park, and Benjamin L. Gelfand, Chicago, Ill., assignors to International Register Company, Chicago, Ill., a corporation of Illinois
Filed Jan. 31, 1962, Ser. No. 170,064
12 Claims. (Cl. 200—38)

This invention relates, generally, to geared driving means for timers and the like and it has particular relation to the gear mechanism thereof.

In timing devices, such as timers for clothes dryers of the gas or electrically heated type, the drying period varies over a wide range, for example from a few minutes to four hours, depending upon the character of the clothing to be dried. It is desirable that a single manually presettable timer be provided for controlling the period of operation of such a device. Where the drying time is of the order of more than one hour, a variation of a few minutes in the drying period which results from presetting the timer with respect to the portion of the setting scale calibrated in hours can be ignored. However, when the drying time is of the order of minutes, it is desirable that a more exact setting of the timer be possible and that the scale setting be calibrated in minutes where the drying time is less than one hour. This is to prevent damage to fragile articles of clothing that are quickly dried and which may be injured when exposed for too long a period to the temperature of the dryer.

Accordingly, among the objects of this invention are: To provide a two speed timer for clothes dryers and like apparatus arranged to operate at a relatively low speed for a part of a relatively long time cycle and to operate at a relatively high speed for a relatively short time cycle; to provide a slow speed gear train between a motor operating at constant speed and the control device for stopping the dryer or other device and also a high speed gear train between the motor and the control device together with means for shifting the drive from the slow speed gear train to the high speed gear train in a new and improved manner; to include in the slow speed gear train a clutch that permits maintaining the driving connection to the control device while the latter is operated under the control of the high speed gear train; to employ a pinion driven at a constant speed for driving both gear trains and to include in the high speed gear train a gear sector having driving connection to the pinion during only a portion of the revolution of the gear sector; to mount the gear sector and driving pinion for relative movement along their respective axes of rotation; and to provide means rotatable with the gear sector for moving the driving pinion out of the plane of the teeth of the gear sector and permitting engagement of the respective gear teeth by relative endwise movement thereof while the gear sector and driving pinion continue to rotate.

Other objects of this invention will, in part, be obvious and in part appear hereinafter.

In the drawings:

FIG. 1 is a front elevational view of a two speed timer embodying this invention.

FIG. 2 illustrates diagrammatically certain of the circuit connections that can be employed for the two speed timer shown in FIG. 1.

FIG. 3 is a view, in front elevation, of the two speed timer, certain parts being broken away in order to show more clearly the details of construction.

FIG. 4 is a view, in side elevation, of the timer shown in FIG. 3 looking from left to right, certain parts being broken away to show more clearly the details of construction.

FIG. 5 shows somewhat diagrammatically how the constant speed drive pinion operates through a low speed gear train and a high speed gear train for driving a member at different speeds in accordance with this invention.

FIG. 6 is a plan view showing the drive pinion out of driving engagement with the gear sector that forms a part of the high speed gear train.

FIG. 7 is a view, similar to FIG. 6, showing the cam on the gear sector approaching the pinion for moving it out of the plane of the teeth on the gear sector.

FIG. 8 is a view, taken generally along the line 8—8, of FIG. 7.

FIG. 9 is a view, similar to FIG. 7, but showing the cam on the gear sector holding the pinion out of the plane of the teeth of the gear sector.

FIG. 10 is a view taken generally along the line 10—10 of FIG. 9.

FIG. 11 is a view, similar to FIGS. 7 and 9, but showing the teeth of the gear sector in driving engagement with the teeth of the drive pinion.

FIG. 12 is a view taken generally along the line 12—12 of FIG. 11.

FIG. 13 is a vertical sectional view taken through the gear case and showing the last gear of the gear train and the shaft which is slidably mounted and carries the constant speed driven pinion.

FIGS. 14, 15 and 16 show an alternate arrangement for the high speed gear train, FIG. 16 being a section taken generally along the line 16—16 of FIG. 14.

Referring now particularly to FIG. 1 of the drawings, it will be observed that the reference character 10 designates, generally, a two speed timer for gas or electrically heated clothes dryers or the like in which the present invention is embodied. The timer 10 makes use of certain features of the construction disclosed in U.S. Patent No. 2,842,626, issued July 8, 1958, and the disclosure thereof is incorporated by reference in the present specification.

The two speed timer 10 includes a panel 11 on which a scale 12 is provided with respect to which a pointer knob 13 is arranged to be manually rotated. The pointer knob 13 is mounted for rotation with a transversely extending shaft 14. It will be observed that the scale 12 is divided in part in hours to run and for illustrative purposes this part of the scale ranges from four hours to one hour. The balance of the scale is calibrated in minutes to run and here the calibration is from fifty five minutes to zero in five minute intervals.

In FIG 2 the arrangement is illustrated diagrammatically. Here it will be observed that conductors 15 and 16 are provided which can be energized from a suitable source of electric current such as a 60 cycle 115 volt source. Where the clothes dryer is of the all electric type, an electric heating element 17 can be employed in conjunction with a motor 18 in accordance with conventional practice. If the clothes dryer is of the gas heated type, then the solenoid for the gas control valve can be substituted for the dryer heating element 17 as will be readily understood. A time motor 19 is provided for controlling the period during which the dryer heating element 17 and the dryer motor 18 are energized. The timer motor 19 is arranged to rotate a cam 20 in a manner to be described hereinafter for controlling the time intervals of energization of the dryer heating element 17 and the dryer motor 18. The cam 20 has a circular peripheral surface 21 in which steps 22 and 23 are provided and with which a cam follower 24 cooperates as described in the patent above referred to. In the arrangement shown in FIG. 2 the cam 20 is in the zero time or off position with the cam follower 20 located in the step 22. On rotation of the cam 20 from the position shown in FIG. 2 contacts 25—25 are first closed to complete an energizing circuit for the dryer motor 18 and timer motor 19 and subsequently contacts 26—26 are closed to complete an energizing circuit for the dryer heating element 17. This is accomplished by rotating the pointer knob 13 in the direction indicated by the arrow 27 in FIG. 1 which effects a corresponding rotation of the cam 20 in the direction indicated by the arrow 28 in FIG. 2. The pointer knob 13 is rotated to a position with respect to the scale 12 corresponding to the time that it is desired that the dryer heating element 17 and the dryer motor 18 be energized. For example, the pointer knob 13 can be rotated in the direction indicated by the arrow 27 to the position corresponding to three hours to run. This causes the cam follower 24 to ride out of the step 22 and onto the circular peripheral surface 21 where the contacts 25—25 and 26—26 are held closed to complete the energizing circuits previously indicated. The timer motor 19 then continues to drive the cam 20 first at a relatively slow speed and during the last hour at a relatively high speed until at the end of the three hour period the cam follower 24 moves into the step 23. As a result of this operation the contacts 26—26 are opened and the dryer heating element 17 is deenergized. The timer motor 19 continues to rotate for a short time, such as fifteen minutes, until the cam follower 24 moves into the step 22 at which time the contacts 25—25 are opened and the dryer motor 18 and timer motor 19 are deenergized. This provides a cool down period before the end of the cycle.

Should the pointer knob 13 be rotated in the direction indicated by the arrow 27 to a position corresponding to a time less than one hour or corresponding to a desired number of minutes to run, such as fifty minutes, then the cam 20 is driven at a relatively high speed to complete the rotation of the cam 20 back to the initial position. The manner in which the two speed rotation of the cam 20 and pointer knob 13 is accomplished will now be described.

Referring first to FIGS. 3 and 4 of the drawings, it will be observed that an insulating base 30 is provided carrying a metallic cover 31 which can be secured by suitable means to the rear of the panel 11. Mounted on the back side of the base plate 30 is the motor 19 which includes a gear case 32 in which a reduction gear train is provided with the last gear thereof being indicated at 33.

As shown in FIG. 13 the gear 33 is mounted on a shaft 34 which is slidable along its axis of rotation and is mounted at one end on a bushing 35 that is carried by the gear case 32. A hairpin spring 36 interfits with an annular groove in the bushing 35 to hold one end of a C-shaped spring 37 in position on the gear case 32 while the other end engages the projecting end 38 of the shaft 34 and serves to bias it to the position shown where a pinion 39 fast on the other end of the shaft 34 is spaced a maximum distance from the front side of the base plate 30. It will be understood that the time motor 19 is of a conventional type which operates at a fixed speed and therefore that the pinion 39 is rotated at a fixed or constant speed in order to provide the desired timed rotation of the cam 20 and pointer knob 13.

Referring now particularly to FIG. 5, the driving connections between the constant speed pinion 39 and the shaft 14 on which the pointer knob 13 and cam 20 are mounted are shown. Two driving connections are provided, one by a low speed gear train that is indicated, generally, at 40 and the other by a high speed gear train that is indicated, generally, at 41.

The low speed gear train 40 includes a gear 44 that is mounted for rotation on a shaft 45 with the arrangement being such that, while it is prevented from moving axially along the shaft 45 it is freely rotatable thereon. Fast on the shaft 45 is a clutch member 46 which cooperates with the gear 44 to provide a one way clutch with the arrangement being such that the pinion 39 can drive the shaft 45 through the gear 44 but permitting the shaft 45 to rotate in the direction in which the gear 44 is driven but at a higher speed. Any suitable one way clutch mechanism can be employed for this purpose such as a resilient plate carrying a detent and arranged to engage any one of a number of openings in the gear 44. Fast on the shaft 45 is a pinion 47 which meshes with a gear 48 that has a pinion 49 rotatable therewith and suitably mounted and in driving engagement with a gear 50 which is fast on the shaft 14 on which the cam 20 also is fast. It will be apparent that the speed at which the shaft 14 is rotated by the pinion 39 through the low speed gear train 40 is relatively low and of course it can be varied by varying the gear ratios as will be understood readily.

The high speed gear train 41 includes a gear sector 51 which is fast on the shaft 14 and thus rotates with the cam 20.

As shown more clearly in FIG. 6 of the drawings the gear sector 51 is provided with gear teeth 52 over approximately one half of its circumference and these gear teeth are positioned, as shown in FIG. 5, in the plane of the gear teeth 53 of the pinion 39 when the pinion 39 occupies the position shown by full lines here.

Because of manufacturing tolerances it is not feasible to arrange for the teeth 53 on the pinion 39 to engage directly the teeth 52 on the gear sector 51. If such operation is undertaken, it is likely that the respective teeth will not mesh and the mechanism will be stalled.

Accordingly, as pointed out above, provision is made for shifting the shaft 34 along its axis of rotation for the purpose of moving the pinion 39 to the position shown by broken lines in FIG. 5. For this purpose a cam 54 is formed integrally with the gear sector 51 and thus rotates therewith and with the cam 20.

When the shaft 14 is rotated in the direction indicated by the arrow 55 in FIG. 6, the leading end 56 of the cam 54 is approaching the constant speed pinion 39. FIG. 7 shows the leading end 56 overlying the pinion 39 and in position so that on continued rotation in the direction indicated by the arrow 55, the inclined cam 54 causes the pinion 39 to be moved toward the base plate 30 and out of the plane of the teeth 52 on the gear sector 51 as shown in FIGS. 9 and 10 of the drawings. During this operation the end of the C-shaped spring 37, FIG. 13, is moved to the position shown by the broken lines.

The continued rotation of the shaft 14 in the direction indicated by the arrow 55 in FIG. 11 finally causes the trailing end 57 of the cam 54 to clear the constant speed pinion 39. As a result the spring 37 acts to move the shaft 34 to a position where the teeth 53 on the pinion 39 are in the plane of the teeth 52 on the gear sector 51 with the engagement being made endwise of the teeth and being made under conditions during which both the gear sector 51 and the pinion 53 are being rotated. Since the gear ratio of the high speed train 41 is such as to rotate the shaft 14 at a higher speed than it is rotated through the low speed gear train 40, the pinions and gears of the latter are rotated at a higher speed than formely to effect a corresponding higher speed of rotation of the shaft 45. Because of the one way clutch interposed between the shaft 45 and the gear 44, this operation is readily permitted although the gear 44 continues to rotate at fixed speed since it remains in driving engagement with the pinion 39.

Now it will be understood that, when the pointer knob 13 is operated to the three hour to run position, the dryer heating element 17 and the dryer motor 18 are energized and the timer motor 19 rotates the cam 20 through the low speed gear train 40. During the balance of one half of the revolution of the cam 20, since the teeth 52 of the gear section 51 are out of engagement with the teeth 53 and the pinion 39, the drive is through the low speed gear train 40. However, after the cam 20 and the shaft 14 have been rotated to the position corresponding to one hour yet to run, the cam 54 will have been rotated to move the pinion 39 out of the plane of the teeth 52 of the gear sector 51 while maintaining driving engagement with the gear 44 and continued drive of the shaft 14 and cam 20 through the low speed gear train 40 until the trailing end 57 of the cam 54 moves past the constant speed pinion 39 whereupon its teeth 53 are moved endwise into engagement with the teeth 52 of the gear sector with the result that the shaft 14 and cam 20 are rotated at a relatively high speed for the last half of the complete revolution to the zero position.

It will be understood that, when the pointer knob 13 is manually operated to a position corresponding to the scale indicated as minutes to run, the drive will be directly through the high speed gear train 41.

Since the minutes to run scale extends over about one half of the circumference of the scale 12, it is possible to position accurately the pointer knob 13 with respect thereto and to set with a relatively high degree of accuracy the time during which the dryer heating element 17 and the dryer motor 18 are energized.

A one way clutch 58, FIG. 13, is interposed between the gear 33 in the gear case 32 and the shaft 34. This permits rotation of the shaft 34 in a forward direction by rotation of the pointer knob 13 to the desired hours or minutes to run without requiring that the gear train in the gear case 32 be rotated.

An alternate arrangement for the high speed gear train 41 is shown, generally, at 59 in FIGS. 14, 15 and 16. The constant speed pinion 39 is arranged to have driving engagement with a wobble gear wheel in the form of a gear sector 60 on the shaft 14 and held square by a coil compression spring 61 against a shoulder 62 on a hub 63 that is integral with the shaft 14. Conjoint rotation of the gear sector 60 and shaft 14 is effected by the provision on the former of a key 64 that extends into a keyway 65 in the latter. A small clearance 66 is provided between the gear sector 60 and the shaft 14 to allow the former to wobble from the position shown in FIG. 14 to that shown in FIG. 15. This action is caused by a cam 67 on the gear sector 60 which, on rotation in the direction indicated by the arrow 68, has its leading end 66 brought into engagement with the pinion 39 which in this case has no translatory movement. After the trailing end 70 of the cam 67 disengages the pinion 39, the spring 61 restores the gear sector 60 to its position in full engagement with the shoulder 62 whereupon gear teeth on gear sector 60 adjacent the trailing end 70 engage endwise with the teeth 53 of the pinion 39 and the shaft 14 is rotated at high speed for the remainder of the cycle. This occurs at the beginning of the last hour for the rotation of the shaft 14 and pointer knob to their terminal positions.

It will be understood that, when the high speed gear train 59 is employed, the low speed gear train 40, previously described, is used and it functions as above set forth during the period preceding the last hour. Because of the one way clutch 46, the drive is shifted to the high speed gear train 59 once the driving connection through it is established.

What is claimed as new is:

1. In combination, a motor, a member rotatable from a first to a second angular position, a first gear train interposed between said motor and said member for driving it at a relatively low speed, clutch means interposed in said first gear train whereby said member can be driven at a relatively high speed while maintaining the connection through said first gear train, a second gear train interposed between said motor and said member for driving it at said relatively high speed, and means responsive to rotation of said member to a predetermined position intermediate said first and second angular positions for shifting the drive to said member to said second gear train to complete the rotation of said member to said second angular position.

2. In combination, a motor, a member rotatable in one direction only from a first to a second angular position, a first gear train interposed between said motor and said member for driving it at a relatively low speed, clutch means interposed in said first gear train whereby said member can be driven at a relatively high speed while maintaining the connection through said first gear train, a second gear train interposed between said motor and said member for driving it at said relatively high speed, manually operable means for rotating said member to said first angular position in advance of said second angular position, and means responsive to rotation of said member to a predetermined position intermediate said first and second angular positions for shifting the drive to said member to said second gear train to complete the rotation of said member to said second angular position.

3. In combination, a motor, a rotatable pinion driven by said motor, a member rotatable from a first to a second angular position, a first gear train interposed between said pinion and said member for driving it at a relatively low speed, a second gear train interposed between said pinion and said member for driving it at a relatively high speed, said second gear train including a gear sector having the teeth thereof engageable with the teeth of said pinion, means mounting said pinion and said gear sector for relative movement along the axes of rotation thereof, and means for effecting relative movement of said pinion and said gear sector to cause endwise engagement of the teeth thereof while maintaining the connection through said first gear train and rotation of said pinion and gear sector.

4. In combination, a motor, a rotatable pinion driven by said motor, a member rotatable from a first to a second angular position, a first gear train interposed between said pinion and said member for driving it at a relatively low speed, clutch means interposed in said first gear train whereby said member can be driven at a relatively high speed while maintaining the connection through said first gear train, a second gear train interposed between said pinion and said member for driving it at said relatively high speed, said second gear train including a gear sector secured to said member and having its teeth engageable with the teeth of said pinion, means mounting said pinion for movement along its axis of rotation, means biasing said pinion to position the teeth thereof in the plane of rotation of said gear sector, and means movable with said gear sector for moving said pinion along its axis of rotation out of said plane of rotation of said gear sector and thereafter permitting said biasing means to move said pinion into said plane of rotation of said gear sector and the respective teeth thereof to move endwise into driving engagement during continued rotation of said pinion and gear sector.

5. In combination, a motor, a rotatable pinion driven by said motor, a member rotatable in one direction only from a first to a second angular position, a first gear train interposed between said pinion and said member for driving it at a relatively low speed, clutch means interposed in said first gear train whereby said member can be driven at a relatively high speed while maintaining the connection through said first gear train, a second gear train interposed between said pinion and said member for driving it at said relatively high speed, said second gear train including a gear sector secured to said member and having its teeth engageable with the teeth of said pinion, means mounting said pinion for movement along its axis of rotation, means biasing said pinion to position the teeth thereof in the plane of rotation of said gear sector, manually operable means for rotating said member to said first angular position in advance of said second angular position, and means movable with said gear sector for moving said pinion along its axis of rotation out of said plane of rotation of said gear sector and thereafter permitting said biasing means to move said pinion into said plane of rotation of said gear sector and the respective teeth thereof to move endwise into driving engagement during continued rotation of said pinion and gear sector.

6. In combination, a driving pinion, means for rotating said pinion, a rotatable driven member, a first gear train interposed between said pinion and said driven member for rotating it at a relatively low speed, a second gear train interposed between said pinion and said driven member for driving it at a relatively high speed, said second gear train including a gear sector having the teeth thereof engageable with the teeth of said pinion, means mounting said pinion and said gear sector for relative movement along the axes of rotation thereof, and means for effecting relative movement of said pinion and said gear sector to cause endwise engagement of the teeth thereof while maintaining the connection through said first gear train and rotation of said pinion and gear sector.

7. In combination, a driving pinion, means for rotating said pinion, a rotatable driven member, a first gear train interposed between said pinion and said driven member for rotating it at a relatively low speed, clutch means interposed in said first gear train whereby said driven member can be rotated at a relatively high speed while maintaining the connection through said first gear train, a second gear train interposed between said pinion and said driven member for rotating said driven member at said relatively high speed, said second gear train including a gear sector secured to said driven member and having its teeth engageable with the teeth of said pinion, means mounting said pinion for movement along its axis of rotation, means biasing said pinion to position the teeth thereof in the plane of rotation of said gear sector, and cam means movable with said gear sector and engageable with said pinion for shifting it along its axis of rotation out of said plane of rotation of said gear sector against said biasing means during a predetermined portion of a revolution of said gear sector whereupon said biasing means moves said pinion into said plane of rotation of said gear sector and its teeth endwise into engagement with the teeth thereof during continued rotation of said pinion and gear sector.

8. In combination, a rotatable gear and a rotatable gear sector arranged for mutual driving engagement, means for driving said gear and said gear sector, means mounting said gear and gear sector for relative movement along their axes of rotation, and means rotatable with said gear sector for engaging said gear to effect said relative movement thereof and to cause endwise engagement of their teeth while rotation thereof continues.

9. In combination, a rotatable gear and a rotatable gear sector arranged for mutual driving engagement, means for driving said gear and said gear sector, means mounting said gear and gear sector for relative movement along their axes of rotation, means biasing said gear and gear sector along their axes of rotation into driving engagement, and means rotatable with said gear sector for engaging said gear to effect relative movement thereof out of driving engagement with said gear sector during a portion of a revolution of said gear sector whereupon said biasing means restores the driving connection between said gear and gear sector by relative endwise movement of the teeth thereof into driving engagement.

10. In combination, a rotatable toothed pinion gear, a gear wheel having gear teeth along only a portion of its periphery and mounted with the gear teeth thereon engageable with the gear teeth of said pinion gear, means rotatable with said gear wheel and reacting against said pinion gear to cause axial movement thereof relative to said gear wheel to position the teeth of said pinion gear out of the plane of the teeth of said gear wheel for a portion of a turn thereof, and means for moving said pinion gear into said plane and its teeth endwise into driving engagement with the teeth of said gear wheel.

11. In a time switch assembly, in combination, a switch to be operated from one position to another position at the end of a predetermined time interval, a constant speed motor, a rotatable pinion driven by said motor at a constant speed, a rotatable cam for operating said switch from said one position to said other position when said cam is rotated to a predetermined angular position, a first gear train interposed between said pinion and said cam for driving said cam at a relatively low speed, a second gear train interposed between said pinion and said cam for driving said cam at a relatively high speed, said second gear train including a gear wheel having gear teeth therealong only a portion of its periphery and engageable with the teeth of said pinion, means providing a wobble mounting for said gear wheel, and means on said gear wheel engageable with said pinion to cause said gear wheel to wobble and its gear teeth to move endwise into driving engagement with the teeth of said pinion while maintaining the connection through said first gear train and rotation of said pinion and gear wheel.

12. In a time switch assembly, in combination, a switch to be operated from one position to another position at the end of a predetermined time interval, a constant speed motor, a rotatable pinion driven by said motor at a constant speed, a rotatable cam for operating said switch from said one position to said other position when said cam is rotated to a predetermined angular position, a first gear train interposed between said pinion and said cam for driving said cam at a relatively low speed, clutch means interposed in said first gear train whereby said cam can be driven at a relatively high speed while maintaining the connection through said first gear train, a second gear train interposed between said pinion and said cam for driving said cam at a relatively high speed, said second gear train including a gear wheel having gear teeth along only a portion of its periphery and engageable with the teeth of said pinion, means providing a wobble mounting for said gear wheel, and means on said gear wheel engageable with said pinion to cause said gear wheel to wobble and its gear teeth to move endwise into driving engagement with the teeth of said pinion.

References Cited by the Examiner
UNITED STATES PATENTS 2,772,576 12/56 Ross _____ 74—368
2,870,834 1/59 Sisson _____ 200—38

BERNARD A. GILHEANY, *Primary Examiner.*
ROBERT K. SCHAEFER, *Examiner.*